United States Patent
Chae et al.

(10) Patent No.: US 11,215,715 B2
(45) Date of Patent: Jan. 4, 2022

(54) METHOD AND DEVICE FOR DERIVING LOCATION INFORMATION BY MEANS OF RECEIVING GPS SIGNAL IN WIRELESS COMMUNICATION SYSTEM

(71) Applicant: LG Electronics Inc., Seoul (KR)

(72) Inventors: Hyukjin Chae, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 428 days.

(21) Appl. No.: 16/398,749

(22) Filed: Apr. 30, 2019

(65) Prior Publication Data

US 2019/0265364 A1  Aug. 29, 2019

Related U.S. Application Data

(63) Continuation of application No. PCT/KR2017/012253, filed on Nov. 1, 2017.
(Continued)

(51) Int. Cl.
| | |
|---|---|
| *H04W 4/40* | (2018.01) |
| *H04W 64/00* | (2009.01) |
| *G01S 19/21* | (2010.01) |
| *G01S 19/25* | (2010.01) |
| *G01S 19/01* | (2010.01) |

(52) U.S. Cl.
CPC ............ *G01S 19/215* (2013.01); *G01S 19/01* (2013.01); *G01S 19/25* (2013.01); *H04W 4/40* (2018.02); *H04W 64/00* (2013.01); *H04W 64/003* (2013.01)

(58) Field of Classification Search
CPC ....... H04W 72/02; H04W 4/40; H04W 76/14; H04W 92/18; H04W 72/0446; H04W 72/04; H04W 8/005; H04W 72/0493; H04W 72/044; H04W 72/1263; H04W 72/14; H04W 28/26; H04W 4/44; H04W 72/12

See application file for complete search history.

(56) References Cited

U.S. PATENT DOCUMENTS

| | | | |
|---|---|---|---|
| 10,219,291 B2* | 2/2019 | Pelletier | H04L 1/1822 |
| 10,244,538 B2* | 3/2019 | Sartori | H04W 74/08 |

(Continued)

FOREIGN PATENT DOCUMENTS

| | | |
|---|---|---|
| JP | 2011-041038 A | 2/2011 |
| JP | 2015-117962 A | 6/2015 |

(Continued)

*Primary Examiner* — Dung Hong
(74) *Attorney, Agent, or Firm* — Dentons US LLP

(57) ABSTRACT

An embodiment of the present invention provides a method for a vehicle-to-everything (V2X) terminal deriving location information by means of receiving a global positioning system (GPS) signal in a wireless communication system. The method, for deriving location information, comprises the steps of: receiving a GPS signal; determining, on the basis of information received from a fixed node, whether or not the GPS signal has been spoofed; and, if the GPS has not been spoofed, deriving location information from the GPS signal, wherein the information received from the fixed node is one of GPS signal reception-related information of the fixed node, location information of the fixed node and time stamp information of the fixed node.

8 Claims, 10 Drawing Sheets

Related U.S. Application Data

(60) Provisional application No. 62/416,142, filed on Nov. 1, 2016.

(56) References Cited

U.S. PATENT DOCUMENTS

| | | | | |
|---|---|---|---|---|
| 2016/0044619 A1* | 2/2016 | Ryu | ................ | H04W 72/0446 370/350 |
| 2016/0286465 A1* | 9/2016 | Wu | .................... | H04W 72/044 |
| 2016/0295624 A1* | 10/2016 | Novlan | ................ | H04W 72/04 |
| 2016/0338094 A1* | 11/2016 | Faurie | ................... | H04W 72/14 |
| 2017/0188391 A1* | 6/2017 | Rajagopal | ......... | H04W 28/0284 |
| 2017/0208616 A1* | 7/2017 | Panteleev | ......... | H04W 72/0446 |
| 2017/0230939 A1* | 8/2017 | Rudolf | ................. | H04W 72/04 |
| 2017/0280472 A1* | 9/2017 | Gupta | ................ | H04W 72/048 |
| 2018/0035279 A1* | 2/2018 | Fujishiro | ........... | H04W 72/0406 |
| 2018/0035427 A1* | 2/2018 | Gupta | .................. | H04L 1/1607 |
| 2018/0092027 A1* | 3/2018 | Sheng | .................. | H04W 48/12 |
| 2018/0167820 A1* | 6/2018 | Belleschi | ............ | H04W 72/044 |
| 2018/0199174 A1* | 7/2018 | Gozalvez-Serrano | ...................... | H04W 72/121 |
| 2018/0317066 A1* | 11/2018 | Xu | ........................ | H04W 40/02 |
| 2019/0020987 A1* | 1/2019 | Khoryaev | ........... | H04W 72/042 |
| 2019/0059071 A1* | 2/2019 | Khoryaev | ........... | H04W 64/006 |
| 2019/0069272 A1* | 2/2019 | Tang | ................ | H04W 72/0446 |
| 2019/0090173 A1* | 3/2019 | Xiao | ...................... | H04W 4/46 |
| 2019/0104551 A1* | 4/2019 | Deenoo | ............ | H04W 72/0446 |
| 2019/0174463 A1* | 6/2019 | Zeng | ................ | H04W 72/0493 |
| 2019/0174547 A1* | 6/2019 | Khoryaev | ............. | H04W 72/02 |
| 2019/0182890 A1* | 6/2019 | Jeong | .................... | H04W 72/14 |
| 2021/0195561 A1* | 6/2021 | Yoon | ................ | H04W 28/0289 |

FOREIGN PATENT DOCUMENTS

| | | |
|---|---|---|
| KR | 10-1366819 B1 | 3/2014 |
| KR | 10-2016-0013146 A | 2/2016 |
| KR | 10-2016-0048802 A | 5/2016 |

\* cited by examiner

FIG. 5
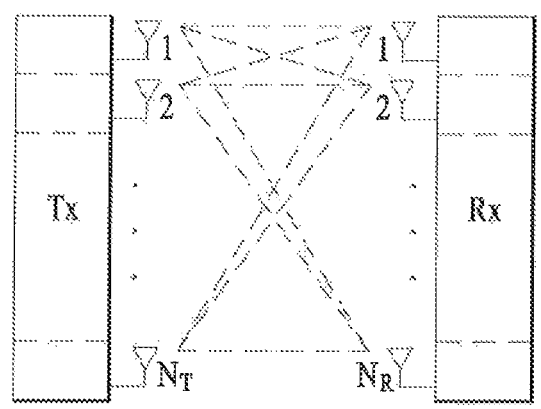
(a)
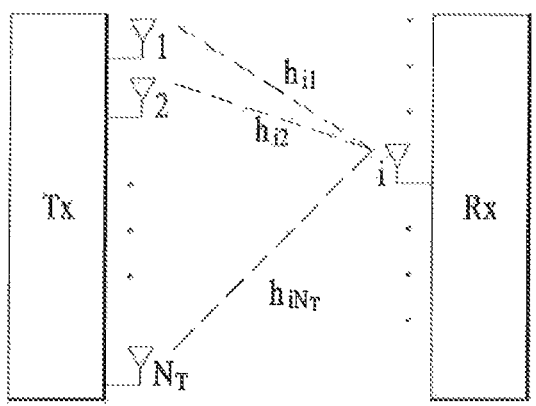
(b)

FIG. 8
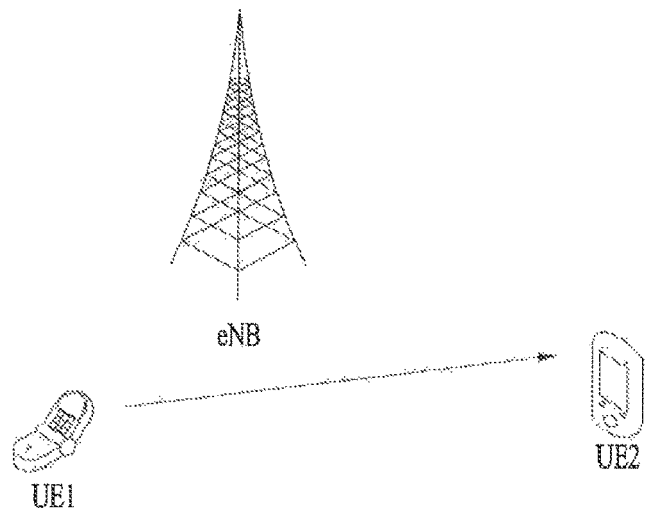
(a)
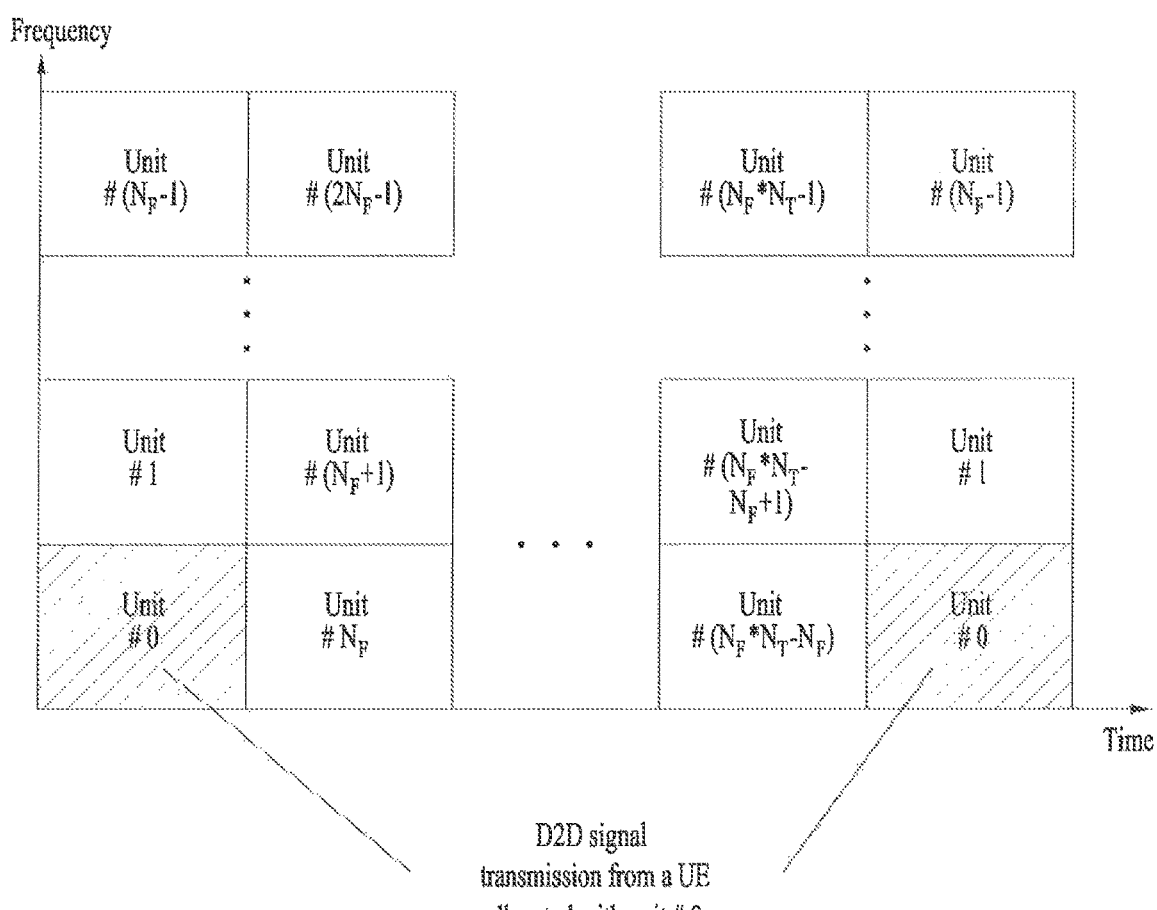
(b)

METHOD AND DEVICE FOR DERIVING LOCATION INFORMATION BY MEANS OF RECEIVING GPS SIGNAL IN WIRELESS COMMUNICATION SYSTEM

This application is a continuation of PCT International Application No. PCT/KR2017/012253, filed on Nov. 1, 2017, which claims priority under 35 U.S.C. 119(e) to U.S. Provisional Application No. 62/416,142 filed on Nov. 1, 2016, which is hereby incorporated by reference herein in their entirety.

TECHNICAL FIELD

The present disclosure relates to a wireless communication system, and more particularly, to a method of deriving, by a User Equipment (UE), location information by receiving a Global Positioning System (GPS) signal and device therefor.

BACKGROUND ART

Wireless communication systems have been widely deployed to provide various types of communication services such as voice or data. In general, the wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Device-to-Device (D2D) communication is a communication scheme in which a direct link is established between User Equipments (UEs) and the UEs exchange voice and data directly without intervention of an evolved Node B (eNB). D2D communication may cover UE-to-UE communication and peer-to-peer communication. In addition, D2D communication may be applied to Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, Vehicle-to-Everything (V2X) communication in conjunction with D2D communication is under consideration. In concept, V2X communication covers Vehicle-to-Vehicle (V2V) communication, Vehicle-to-Pedestrian (V2P) communication for communication between a vehicle and a different kind of terminal, and Vehicle-to-Infrastructure (V2I) communication for communication between a vehicle and a roadside unit (RSU).

DISCLOSURE

Technical Problem

The object of the present disclosure is to provide a method of deriving, by a UE, location information by receiving a GPS signal and a method of securing the reliability of location information.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an embodiment of the present disclosure, provided is a method of deriving, by a Vehicle-to-Everything (V2X) User Equipment (UE), location information by receiving a Global Positioning System (GPS) signal in a wireless communication system. The method may include: receiving the GPS signal; determining whether the GPS signal is spoofed based on information received from a fixed node; and deriving the location information from the GPS signal when the GPS signal is not spoofed. In this case, the information received from the fixed node may include one of GPS signal reception related information of the fixed node, location information of the fixed node, and time stamp information of the fixed node.

In another embodiment of the present disclosure, provided is a Vehicle-to-Everything (V2X) User Equipment (UE) for deriving location information by receiving a Global Positioning System (GPS) signal in a wireless communication system. The V2X UE may include: a transmitting module; a receiving module; and a processor. The processor may be configured to receive the GPS signal through the receiving module, determine whether the GPS signal is spoofed based on information received from a fixed node, and derive the location information from the GPS signal when the GPS signal is not spoofed. In this case, the information received from the fixed node may include one of GPS signal reception related information of the fixed node, location information of the fixed node, and time stamp information of the fixed node.

The GPS signal reception related information of the fixed node may include one of a Doppler shift for each GPS satellite, a time variation in the Doppler shift for each GPS satellite, carrier frequency offset information, and a time variation in the carrier frequency offset information.

When a difference between the Doppler shift for each GPS satellite and a Doppler shift for a satellite transmitting the received GPS signal is equal to or smaller than a predetermined value, the UE may determine that the GPS signal is spoofed.

The GPS signal reception related information of the fixed node may include either spatial correlation information for each GPS satellite or a time variation in the spatial correlation information for each GPS satellite.

When a difference between the spatial correlation information for each GPS satellite and spatial correlation of the GPS signal obtained by the UE is equal to or smaller than a predetermined value, the UE may determine that the GPS signal is spoofed.

The GPS signal reception related information of the fixed node may include either carrier phase shift information for each GPS satellite or a time variation in the carrier phase shift information for each GPS satellite.

When a difference between the carrier phase shift information for each GPS satellite and carrier phase shift information for a satellite transmitting the GPS signal is equal to or smaller than a predetermined value, the UE may determine that the GPS signal is spoofed.

The GPS signal reception related information of the fixed node may include at least one of carrier-to-noise-density ratio (C/No (C over No)) information, SNR information, reception power information, and an L1/L2 signal reception power ratio for each GPS satellite.

The location information of the fixed node may include at least one of latitude, longitude, and altitude information of the fixed node.

The location information of the fixed node may include a difference between location information derived by the fixed node from the GPS signal and location information of the fixed node possessed by the fixed node.

When the difference between the location information derived by the fixed node from the GPS signal and the location information of the fixed node possessed by the fixed node is greater than a predetermined value, the UE may determine that the GPS signal is spoofed.

The location information of the fixed node may include a maximum location difference between UEs receiving a signal from the fixed node.

When a location difference between the location information derived from the GPS signal and the fixed node is greater than the maximum location difference, the UE may determine that the GPS signal is spoofed.

When the time stamp information of the fixed node is different from timing information derived from the GPS signal, the UE may determine that the GPS signal is spoofed.

Advantageous Effects

According to the present disclosure, whether a GPS signal is spoofed can be determined, thereby obtaining reliable location information.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the disclosure. In the drawings:

FIG. 5 is a view illustrating the configuration of a wireless communication system having multiple antennas;

FIG. 8 is a view illustrating an exemplary D2D resource pool for D2D communication;

MODE FOR THE INVENTION

Figure 1:
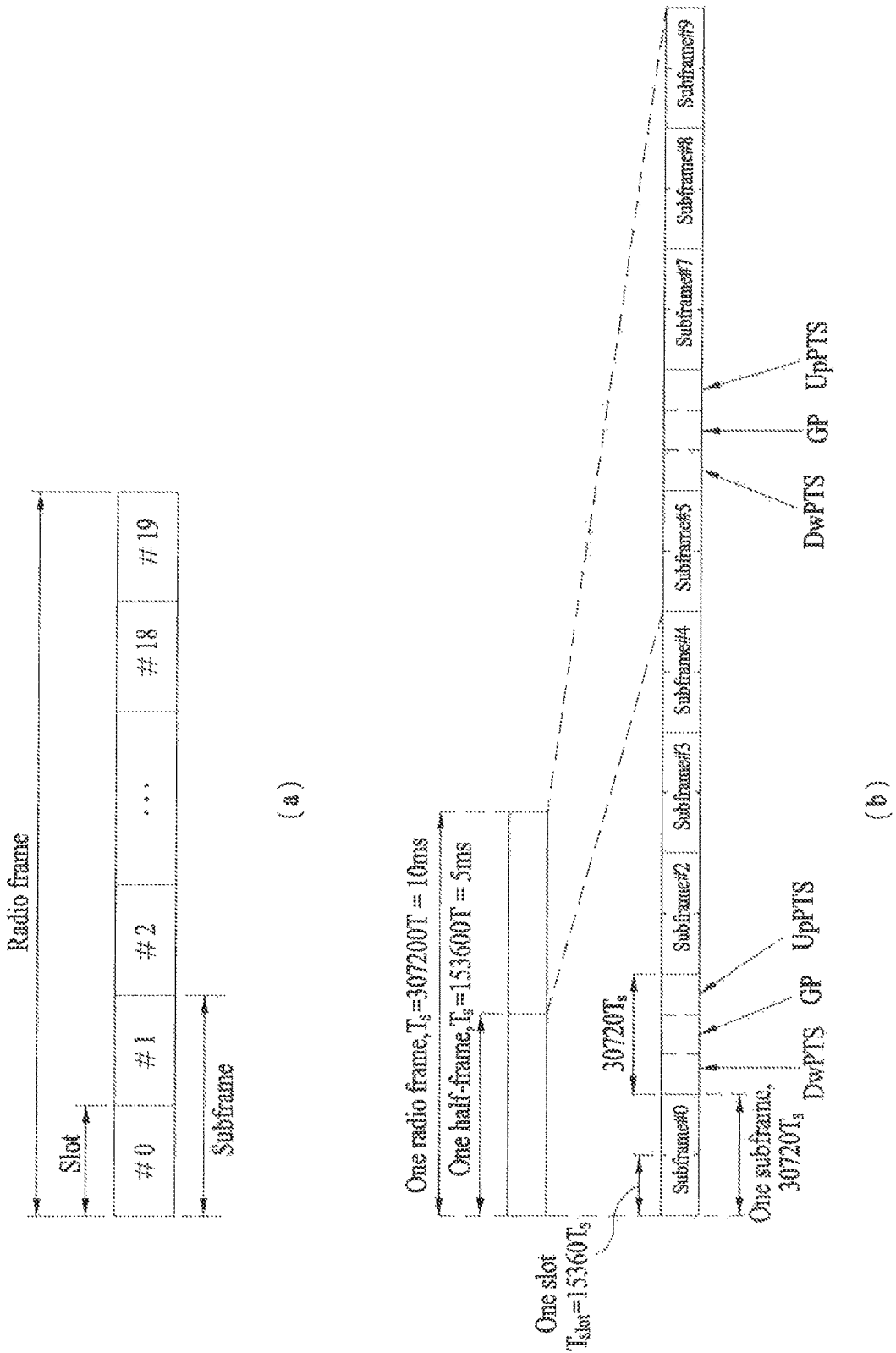
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), a sector, a Remote Radio Head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus, when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a Physical Downlink Control Channel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
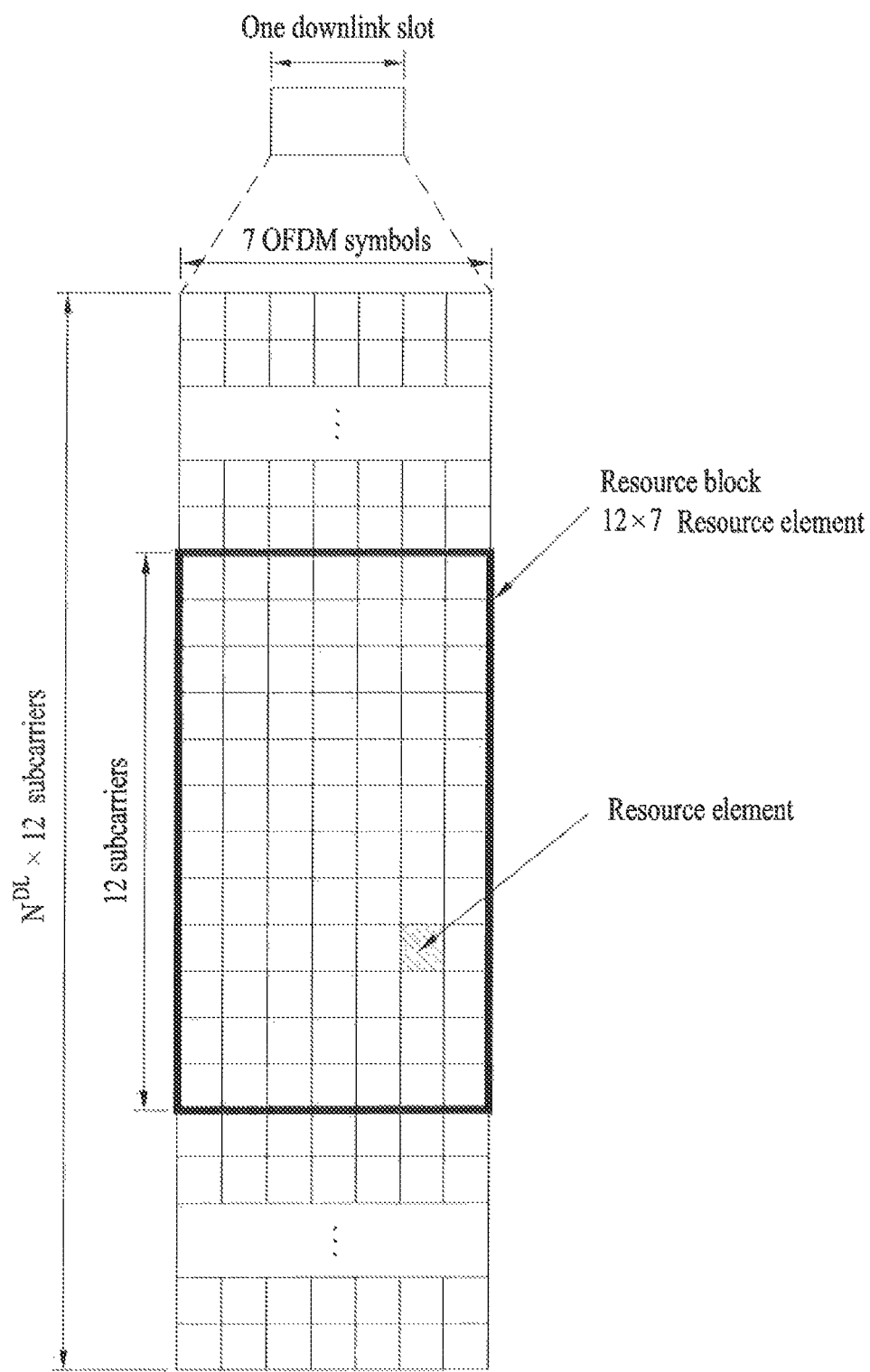
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
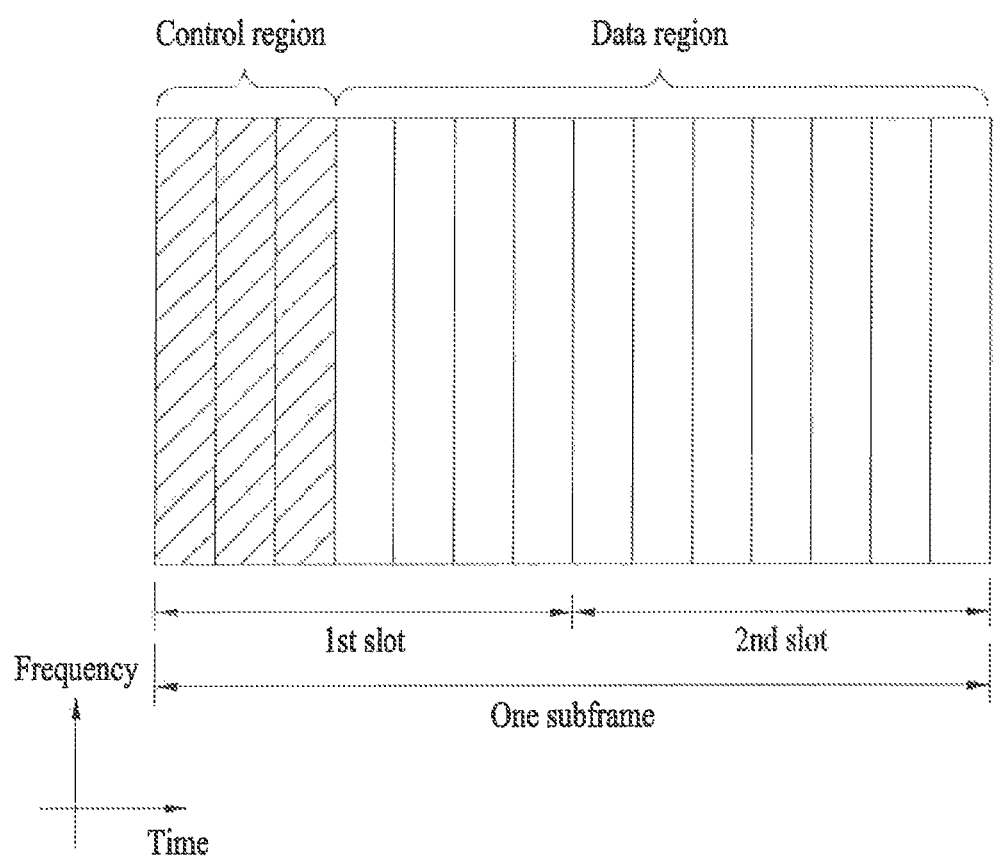
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator Channel (PCFICH), a Physical Downlink Control Channel (PDCCH), and a Physical HARQ (hybrid automatic repeat request) Indicator Channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an identifier (ID) known as a Radio Network Temporary Identifier (RNTI) according to the owner or usage of the PDCCH. If the PDCCH is directed to a specific UE, its CRC may be masked by a Cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a random access response in response to a random access preamble transmitted by a UE, its CRC may be masked by a Random Access-RNTI (RA-RNTI).

Figure 4:
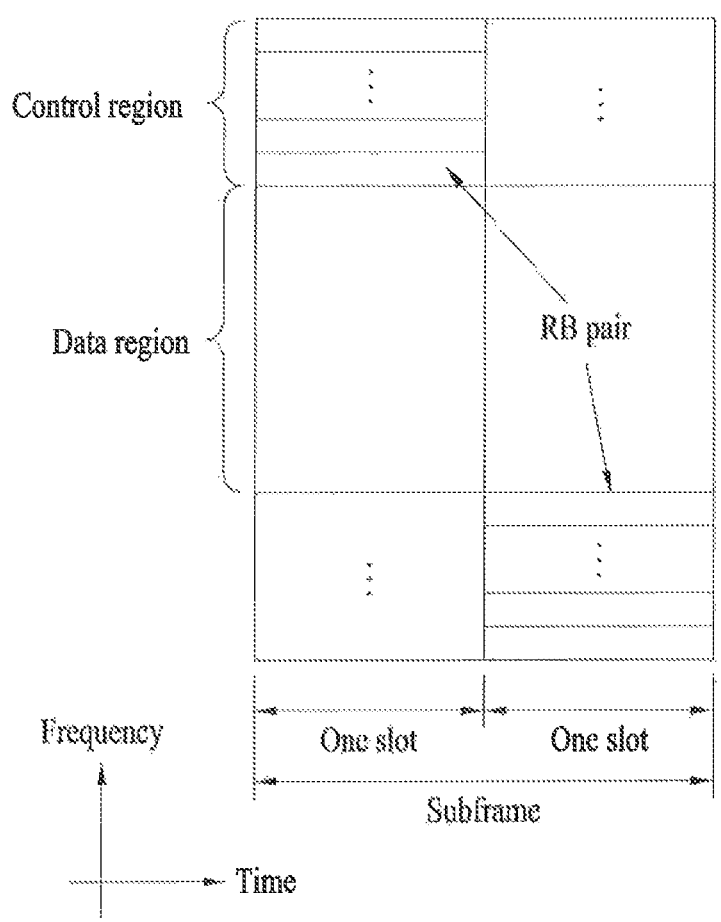
FIG. 4 is a view illustrating the structure of an uplink subframe.

FIG. 4 illustrates the structure of an uplink subframe. An uplink subframe may be divided into a control region and a data region in the frequency domain. A Physical Uplink Control Channel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus, it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating the configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s}=[\hat{s}_1,\hat{s}_2,\ldots,\hat{s}_{N_T}]^T=[P_1s_1,P_2s_2,\ldots,P_{N_T}s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, s_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y=[y_1,y_2,\ldots,y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T=[h_{i1},h_{i2},\ldots,h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n=[n_1,n_2,\ldots,n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx+n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
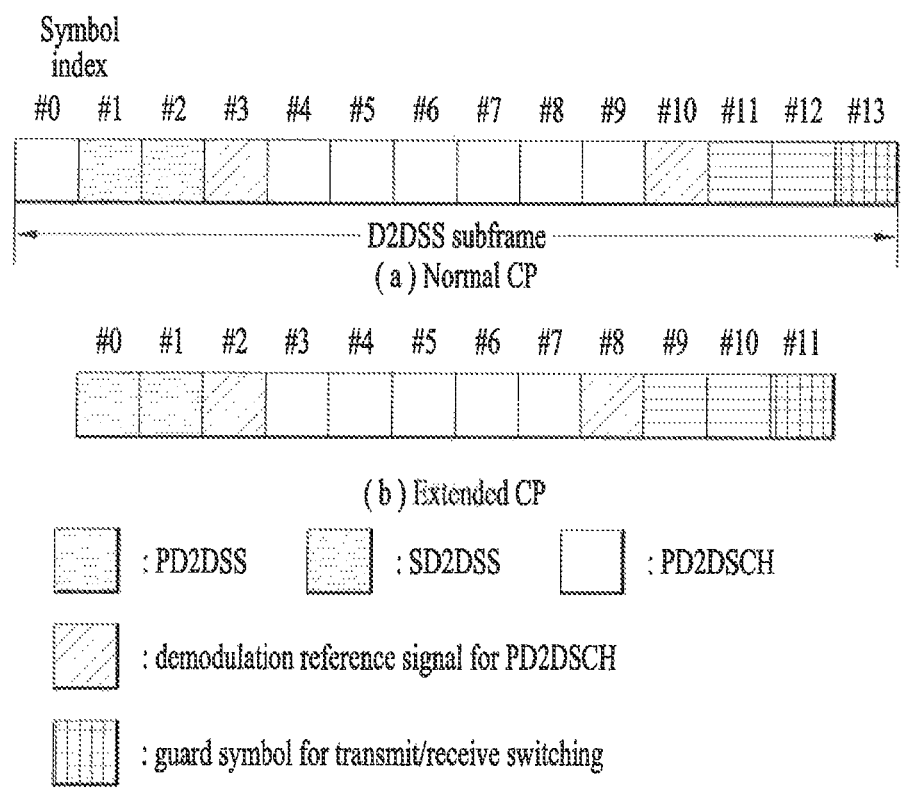
FIG. 6 is a view illustrating a subframe carrying a device-to-device (D2D) synchronization signal.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
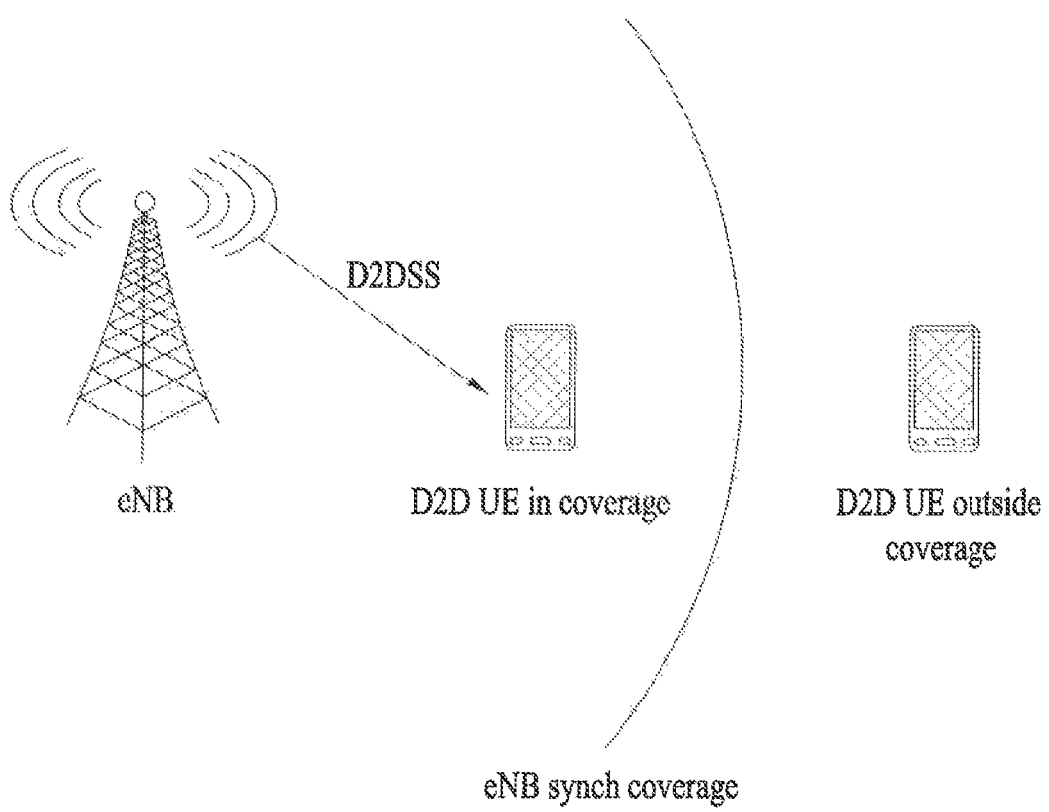
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 illustrates UE1 and UE2 performing D2D communication and a D2D resource pool used by UE1 and UE2. In FIG. 8(*a*), a UE corresponds to a terminal or a network device such as an eNB transmitting and receiving a signal according to a D2D communication scheme. A UE selects a resource unit corresponding to a specific resource from a resource pool corresponding to a set of resources and transmits a D2D signal using the selected resource unit. As a receiving UE, UE2 may receive the configuration of a resource pool, where UE1 perform signal transmission, and detect a signal from UE1 in the corresponding resource pool. In this case, if UE1 is in the coverage of an eNB, the eNB may inform UE1 of the resource pool. If UE1 is out of the coverage of the eNB, the resource pool may be informed by a different UE or determined as predetermined resources. In general, a resource pool includes a plurality of resource units. A UE may select one or more resource units from among the plurality of resource units and use the selected resource unit(s) for D2D signal transmission. FIG. 8(*b*) shows an example of configuring resource units. Referring to FIG. 8(*b*), it can be seen that all frequency resources are divided into $N_F$ resource units and all time resources are divided into $N_T$ resource units, that is, a total of $N_F*N_T$ resource units are defined. Here, a resource pool may be repeated with a period of $N_T$ subframes. In particular, as shown in FIG. 8, one resource unit may be repeated periodically. Alternatively, to obtain a diversity gain in the time or frequency domain, the index of a physical resource unit mapped to a logical resource unit may be changed over time according to a predetermined pattern. In this resource unit structure, a resource pool may correspond to a set of resource units capable of being used by a UE to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a Modulation and Coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
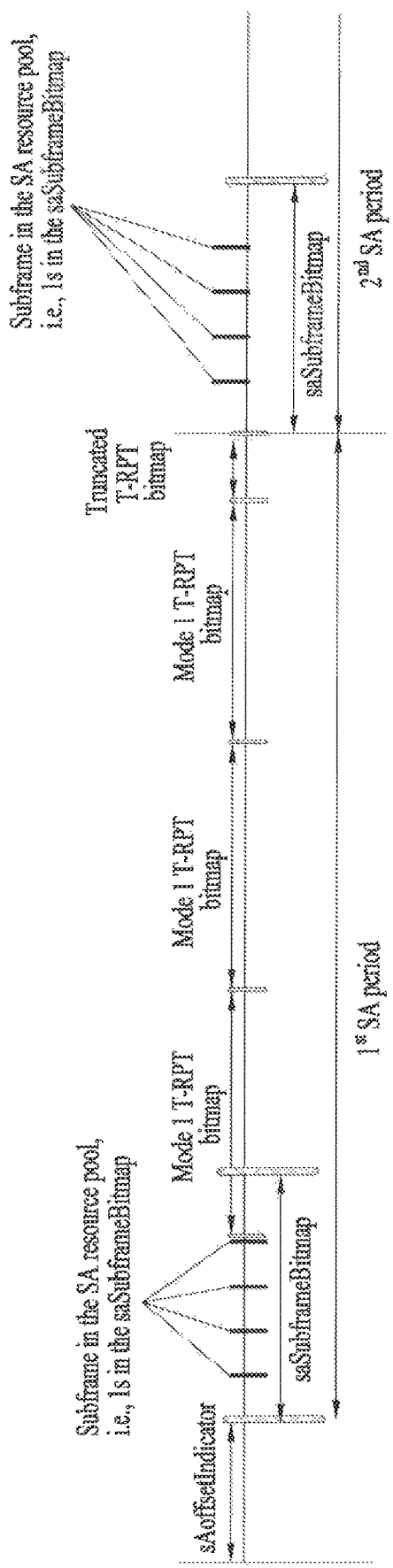
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to is set in a T-RPT bitmap in an indicated T-RPT and transmits one medium access control layer protocol data unit (MAC PDU) four times.

For V2V communication, a periodic type of Cooperative Awareness Message (CAM) and an event-triggered type of Decentralized Environmental Notification Message (DENM) may be used. The CAM may include dynamic state information of a vehicle such as direction and speed, vehicle static data such as dimensions, and basic vehicle information such as ambient illumination states, path details, etc. The CAM may be 50 to 300 bytes long. In addition, the CAM is broadcast, and its latency should be less than 100 ms. The DENM may be generated upon occurrence of an unexpected incident such as a breakdown, an accident, etc. The DENM may be shorter than 3000 bytes, and it may be received by all vehicles within the transmission range. The DENM may have priority over the CAM. When it is said that messages are prioritized, it may mean that from the perspective of a UE, if there are a plurality of messages to be transmitted at the same time, a message with the highest priority is preferentially transmitted, or among the plurality of messages, the message with highest priority is transmitted earlier in time than other messages. From the perspective of multiple UEs, a high-priority message may be regarded to be less vulnerable to interference than a low-priority message, thereby reducing the probability of reception error. If security overhead is included in the CAM, the CAM may have a large message size compared to when there is no security overhead.

Embodiment

According to an embodiment of the present disclosure, a UE may receive a Global Positioning System (GPS) signal, determine whether the GPS signal is spoofed based on information received from a fixed node, and then derive location information from the GPS signal when the GPS signal is not spoofed. Here, the information received from the fixed node may include one of the following: i) information related to GPS signal reception (GPS signal reception related information) of the fixed node; ii) location information of the fixed node; and iii) time stamp information of the fixed node. The fixed node may transmit some or all of the following: information on GPS signal reception in a specific area; location information of the corresponding node; information used for checking the reliability of the location information; and a signal for positioning (i.e., Reference Signal (RS)) to neighboring UEs periodically, aperiodic ally, or upon occurrence of a specific event.

The GPS signal reception related information of the fixed node may include one of the following: a Doppler shift for each GPS satellite (per PRN code); a time variation in the Doppler shift for each GPS satellite (per PRN code); carrier frequency offset information; and a time variation in the carrier frequency offset information. Since a satellite observed in a specific location moves along a specific orbit, Doppler shift information may vary in a specific direction. Based on the above fact, the UE may determine that the GPS signal is spoofed when the Doppler shift for each GPS satellite (per each PRN code) is almost equal to the Doppler shift for a satellite that transmits the received GPS signal, that is, when a difference therebetween is equal to or smaller than a predetermined value.

The GPS signal reception related information of the fixed node may include either spatial correlation information for each GPS satellite (per PRN code) or a time variation in the spatial correlation information for each GPS satellite (per PRN code). The UE may determine that the GPS signal is spoofed when the spatial correlation information for each GPS satellite (per PRN code) is almost equal to spatial correlation of the GPS signal obtained by the UE, that is, when a difference therebetween is equal to or smaller than a predetermined value. Since a satellite observed in a specific location moves along a specific orbit, the spatial correlation of a signal from the corresponding satellite may be similarly observed when receivers are located close to each other.

In addition, the GPS signal reception related information of the fixed node may include carrier phase shift information for each GPS satellite (per PRN code) or a time variation in the carrier phase shift information for each GPS satellite (per PRN code). Since a satellite observed in a specific location moves along a specific orbit, the phase shift of a corresponding signal may have similar values when receivers are located close to each other. Therefore, when the carrier phase shift information for each GPS satellite (per PRN code) is almost equal to the carrier phase shift information for the satellite that transmits the received GPS signal, that is, when a difference therebetween is equal to or smaller than a predetermined value, the UE may determine that the GPS signal is spoofed.

Moreover, the GPS signal reception related information of the fixed node may include at least one of the following: carrier-to-noise-density ratio (C/No) information; SNR information; received power information; and an L1/L2 signal reception power ratio for each GPS satellite (per PRN code) or (time) variations therein. The SNR or signal power of a specific satellite may be similarly observed when receivers are located close to each other, and thus such information may be transmitted to the UE in order to assist the UE in determining whether the GPS signal is spoofed.

The location information of the fixed node may include at least one of the following: latitude, longitude, and altitude information of the fixed node. The information may be known in advance to the node (for example, the information may correspond to values when the fixed node was installed).

In addition, the location information of the fixed node may correspond to a difference between location information derived by the fixed node from the GPS signal and location information of the fixed node possessed by the fixed node. When the difference between the location information derived by the fixed node from the GPS signal and the location information of the fixed node possessed by the fixed node is greater than a predetermined value, the UE may determine that the GPS signal is spoofed. Since the fixed node may suffer from a confusion in the location information when a spoofing attack occurs in the corresponding area, the fixed node may inform neighboring UEs of the difference to allow them to detect the presence or absence of the spoofing.

Moreover, the location information of the fixed node may correspond to a maximum location difference between UEs that receive a signal from the fixed node. When a location difference between the location information derived from the GPS signal and the fixed node is greater than the maximum location difference, the UE may determine that the GPS signal is spoofed. Specifically, location information possessed by UEs within a range capable of receiving a signal from the corresponding node is out of the transmission range of the fixed node, the presence or absence of the spoofing may be determined. When the location difference between the location information derived from the GPS signal and the fixed node is greater than the maximum location difference, the UE may determine that the GPS signal is spoofed. Alternatively, assuming that the fixed node can transmit UEs in region A, if the location information derived by the UE from the GPS signal indicates that it is out of region A, the UE may determine that the GPS signal is spoofed.

Meanwhile, when the time stamp information of the fixed node is different from timing information derived from the GPS signal, the UE may determine that the GPS signal is spoofed. The time stamp information, which is calculated by and stored in the fixed node, may be transmitted to the UE, and the UE may check the reliability of the location information using the time stamp information. Specifically, when the spoofing occurs, the timing information of the received GPS signal may be different from the original information of the satellite. However, since the fixed node continuously receives GPS signals at the corresponding location, the fixed node may have accurate timing information. By broadcasting the accurate timing information, the fixed node may allow neighboring UEs to detect the spoofing when there is a timing mismatch due to the occurrence of the spoofing. Further, the fixed node may transmit an RS to allow neighboring UEs to perform positioning.

In the conventional LTE V2V communication, resources for transmitting a PSSCH are selected based on a resource reservation interval and maximum transmission opportunities in a set, and the PSSCH is transmitted on the selected resources through a transmitting module. In this case, resources for retransmitting the PSSCH may be selected based on the selected resources and a time-domain separation distance therebetween. Hereinafter, details thereof will be described. For PSSCH transmission, a set of subframes $t\_(n+P\_rsvp*j)\char`\^(SL)$ (j=0, 1, . . . , J−1) are selected, where Prsvp is a resource reservation interval indicated through higher layer signaling, J is maximum transmission opportunities in a (selected subframe) set, and SL means sidelink. In this case, a resource set for PSSCH retransmission is determined as $t\_(n+k+P\_rsvp*j)\char`\^(SL)$, where k is a non-zero integer satisfying the condition of −15≤k≤15.

According to the above retransmission resource selection method, when sidelink subframes are sparsely placed or when there is a certain distance between sidelink subframes due to the presence of a DL subframe, a special subframe, or a synchronization subframe, a time difference between initial transmission and retransmission for a specific MAC PDU may significantly increase if the above conditions are applied. As a result, a receiving UE may suffer from excessive buffering, or latency requirements may not be satisfied.

Therefore, according to an embodiment of the present disclosure, a resource set for PSSCH retransmission is selected based on a selected resource set and a time-domain separation distance (k) therebetween. In this case, the time-domain distance may have a different maximum value for each TDD configuration or TDD uplink-downlink configuration configured for each V2X UE. Specifically, as the number of UL subframes in the TDD configuration configured for the V2X UE decreases, the maximum value of the time-domain separation distance may decrease. The maximum separation distance between retransmission subframes may vary between a TDD configuration with many UL subframes and a TDD configuration with few UL subframes. For example, in the case of TDD configuration 5, since there is a single UL subframe within 10 ms, the maximum separation distance is limited to 1. Accordingly, a rule may be defined as follows: retransmission should not be performed over the maximum separation distance. This method may be interpreted to mean that retransmission is not allowed in a specific TDD configuration. That is, this method allows retransmission to be performed within a certain (absolute) time by applying different limiting conditions for the subframe separation distance when UL subframes are sparsely placed. In this case, the range of k may be separately configured in TDD configurations 0 to 6 (−15≤k≤15 in the prior art). Alternatively, a scaling factor depending on TDD configurations may be applied to the maximum value of the time-domain separation distance in the prior art. For example, in the case of TDD configuration 5, a scaling factor of 5 is applied to the upper and lower limit values (maximum values) of the conventional range of k, −15≤k≤15, and in the case of TDD configuration 0, a scaling factor of 1 is applied thereto. The value of a scaling factor for each TDD configuration may be indicated through higher layer or physical layer signaling, or it may be preconfigured for UEs.

The maximum separation distance may be configured only for subframes allocated V2V subframe indices except synchronization subframes. When resource pools are sparsely arranged, V2V subframes are indexed first except synchronization subframes, the limiting condition of +/−15 is applied within the corresponding subframe indices, and then transmission subframes are selected only from subframes in a specific resource pool. According to this method, even in a TDD configuration with many DL subframes, retransmission subframes may be selected within a certain absolute time.

Meanwhile, when a V2X UE operates in FDD mode, the maximum value of a time-domain separation distance may vary depending on the number of sidelink subframes within a predetermined time period. That is, the maximum separation distance between retransmission subframes may vary depending on the number of sidelink subframes within a certain time period. For example, the maximum value of the time-domain separation distance may decrease as the number of sidelink subframes within the predetermined time period decreases.

Since the same problem may occur in the case of a resource pool configuration, which is not a TDD configuration, if sidelink subframes are sparsely allocated, the method may be applied to FDD. As a particular example, when the number of sidelink subframes within a certain time period (for example, a resource pool bitmap length) is smaller than a predetermined value, the maximum separation distance may be set to +/−X (where X is smaller than 15). This method is not simply limited to two steps. That is, the number of sidelink subframes (P) within a certain time period may be configured using multiple steps as follows: P<X1, X1<=P<X2, X2<=P<X3, . . . , and the maximum separation distance may be configured to vary in each case.

Meanwhile, both a resource set for PSSCH transmission and a resource set for PSSCH retransmission may be selected within a range in accordance with the latency requirements. A UE may be configured to select subframes from a region capable of satisfying the latency requirements within +/−15 subframes. For example, even when the first subframe among sidelink subframes is selected from the region satisfying the latency requirements, if retransmission subframes are selected within the range of +/−15 with respect to the corresponding subframe, the latency requirements may not be satisfied. To solve this problem, an additional rule may be defined as follows: the retransmission subframes should also be selected within the range capable of satisfying the latency requirements. According to this method, even when there are different packet latency requirements, stable retransmission may be achieved by applying the additional limiting condition to the retransmission subframes.

The above-described methods can be equally/similarly applied to selection of a single subframe for PSSCH transmission, which is described in detail in Clause 14.1.1.6 in TS 36.213. The single subframe for the PSSCH transmission is selected within a selection window of [n+T1, n+T2], where T1 and T2 are currently defined as T1≤4 and 20≤T2≤100, respectively. In this case, the selection window size (T1, T2) may be configured to vary depending on TDD configurations, the number of sidelink subframes within a certain time period, or latency requirements. Further, a rule may be defined as follows: retransmission resources should be selected within a selection window. The present disclosure is not limited to direct communication between UEs. That is, the disclosure may be used for uplink or downlink communication. In this case, the proposed methods may be used by an eNB, a relay node, etc.

Since each of the examples of the proposed methods may be included as one method for implementing the present disclosure, it is apparent that each example can be regarded as a proposed method. In addition, although the proposed methods can be implemented independently, some of the proposed methods can be combined (or merged) for implementation. Moreover, a rule may be defined as follows: information on whether the proposed methods are applied (or information on rules related to the proposed methods) should be transmitted from an eNB to a UE through a predefined signal (e.g., a physical layer signal, a higher layer signal, etc.). Alternatively, a rule may be defined as follows: a transmitting UE signals the information to a receiving UE or a receiving UE requests a transmitting UE to transmit the information.

Device Configuration According to Embodiment of the Present Disclosure

Figure 10:
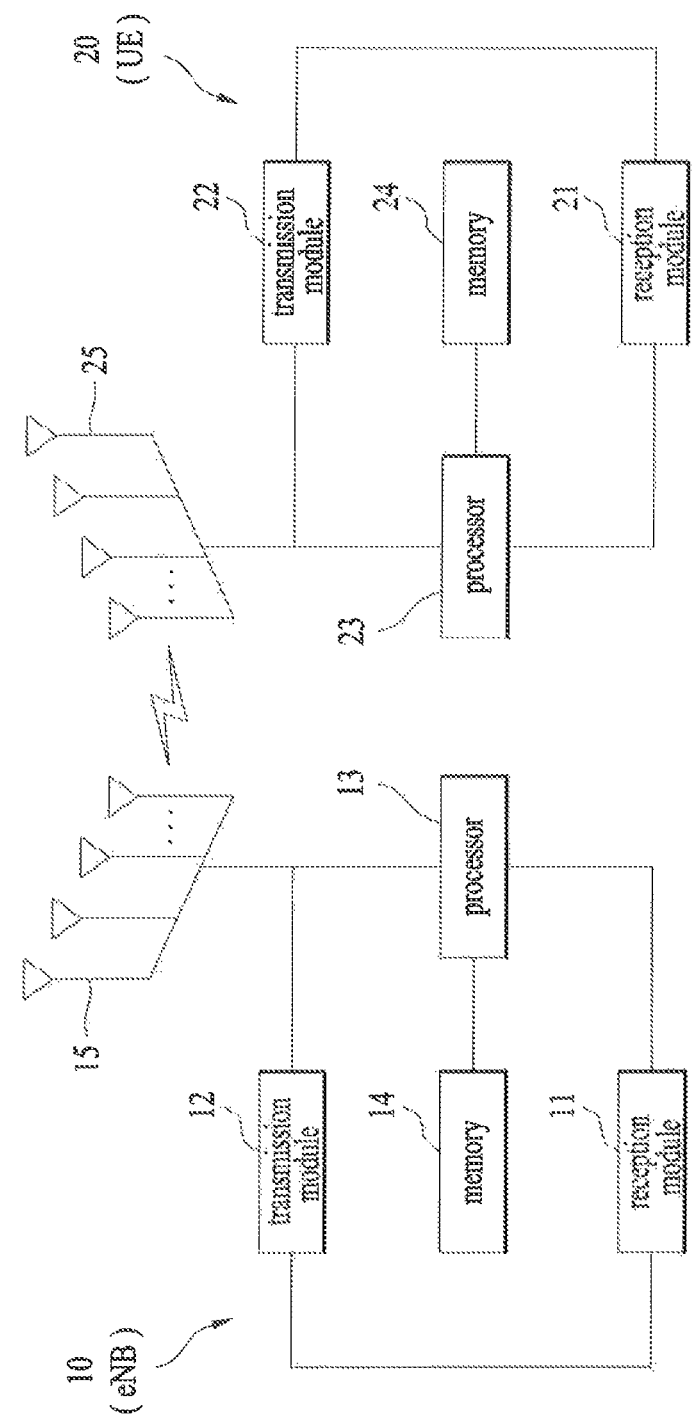
FIG. 10 is a view illustrating the configurations of transmitting and receiving devices.

FIG. 10 is a diagram illustrating the configurations of a transmission point device and a UE device according to embodiments of the present disclosure.

Referring to FIG. 10, the transmission point device 10 may include a receiving module 11, a transmitting module 12, a processor 13, a memory 14, and a plurality of antennas 15. The plurality of antennas 15 may mean that the transmission point device 10 supports Multiple-Input Multiple-Output (MIMO) transmission and reception. The receiving module 11 may be configured to receive various signals, data, and information from a UE in uplink. The transmitting module 12 may be configured to transmit various signals, data, and information to a UE in downlink. The processor 13 may be configured to control overall operations of the transmission point device 10. The processor 13 of the transmission point device 10 according to an embodiment of the present disclosure may be configured to perform the processes required for the above-described embodiments.

In addition, the processor 13 of the transmission point device 10 may be configured to perform a function of processing information received by the transmission point device 10 or information to be transmitted by the transmission point device 10. The memory 14 may be configured to store the processed information during a prescribed time period, and it may be replaced with a component such as a buffer (not shown in the drawing).

Referring again to FIG. 10, the UE device 20 may include a receiving module 21, a transmitting module 22, a processor 23, a memory 24, and a plurality of antennas 25. The plurality of antennas 25 may mean that the UE device 20 supports MIMO transmission and reception. The receiving module 21 may be configured to receive various signals, data, and information from an eNB in downlink. The transmitting module 22 may be configured to transmit various signals, data, and information to the eNB in uplink. The processor 23 may be configured to control overall operations of the UE device 20.

The processor 23 of the UE device 20 according to an embodiment of the present disclosure may be configured to perform the processes required for the above-described embodiments. Specifically, the processor may be configured to receive a GPS signal through the receiving module, determine whether the GPS signal is spoofed based on information received from a fixed node, and derive location information from the GPS signal when the GPS signal is not spoofed. In this case, the information received from the fixed node may be one of GPS signal reception related information of the fixed node, location information of the fixed node, and time stamp information of the fixed node.

In addition, the processor 23 of the UE device 20 may be configured to perform a function of processing information received by the UE device 20 or information to be transmitted by the UE device 20. The memory 24 may be configured to store the processed information during a prescribed time period, and it may be replaced with a component such as a buffer (not shown in the drawing).

The transmission point device 10 and the UE device 20 may be implemented such that the above-described various embodiments of the present disclosure are applied independently or two or more embodiments are applied simultaneously. Here, redundant descriptions are omitted for clarity.

The description of the transmission point device 10 of FIG. 10 may be equally applied to a relay operating as a downlink transmission entity or an uplink reception entity, and the description of the UE device 20 of FIG. 10 may be equally applied to a relay operating as a downlink reception entity or an uplink transmission entity.

The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method of transmitting, by a Vehicle-to-Everything (V2X) User Equipment (UE), a Physical Sidelink Shared Channel (PSSCH) after selecting resources in a wireless communication system, the method comprising:
   selecting a resource set for transmitting the PSSCH based on a resource reservation interval and maximum transmission opportunities in a set; and
   transmitting the PSSCH in the selected resource set,
   wherein a resource set for retransmitting the PSSCH is selected based on the selected resource set and a time-domain separation distance therebetween, and
   wherein a maximum value of the time-domain separation distance is configured differently for each Time Division Duplex (TDD) configuration configured for the V2X UE.

2. The method of claim 1, wherein the maximum value of the time-domain separation distance decreases as the number of Uplink (UL) subframes in a TDD configuration configured for the V2X UE decreases.

3. The method of claim 1, wherein a scaling factor is applied to the maximum value of the time-domain separation distance.

4. The method of claim 3, wherein the scaling factor decreases as the number of Uplink (UL) subframes in a TDD configuration configured for the V2X UE decreases.

5. The method of claim 1, wherein when the V2X UE operates in Frequency Division Duplex (FDD) mode, the maximum value of the time-domain separation distance varies depending on the number of sidelink subframes within a predetermined time period.

6. The method of claim 5, wherein the maximum value of the time-domain separation distance decreases as the number of the sidelink subframes within the predetermined time period decreases.

7. The method of claim 1, wherein both of the resource set for transmitting the PSSCH and the resource set for retransmitting the PSSCH are selected within a range in accordance with latency requirements.

8. A Vehicle-to-Everything (V2X) User Equipment (UE) for performing reselection of Physical Sidelink Shared Channel (PSSCH) resources in a wireless communication system, the V2X UE comprising:
   a transmitting module;
   a receiving module; and
   a processor,
   wherein the processor is configured to select a resource set for transmitting a PSSCH based on a resource reservation interval and maximum transmission opportunities in a set and transmit the PSSCH in the selected resource set through the transmitting module,
   wherein a resource set for retransmitting the PSSCH is selected based on the selected resource set and a time-domain separation distance therebetween, and
   wherein a maximum value of the time-domain separation distance is configured differently for each Time Division Duplex (TDD) configuration configured for the V2X UE.

* * * * *